Sept. 2, 1924.
G. A. MEYERS ET AL
CULTIVATOR
Filed April 3, 1922    2 Sheets-Sheet 1
1,506,818
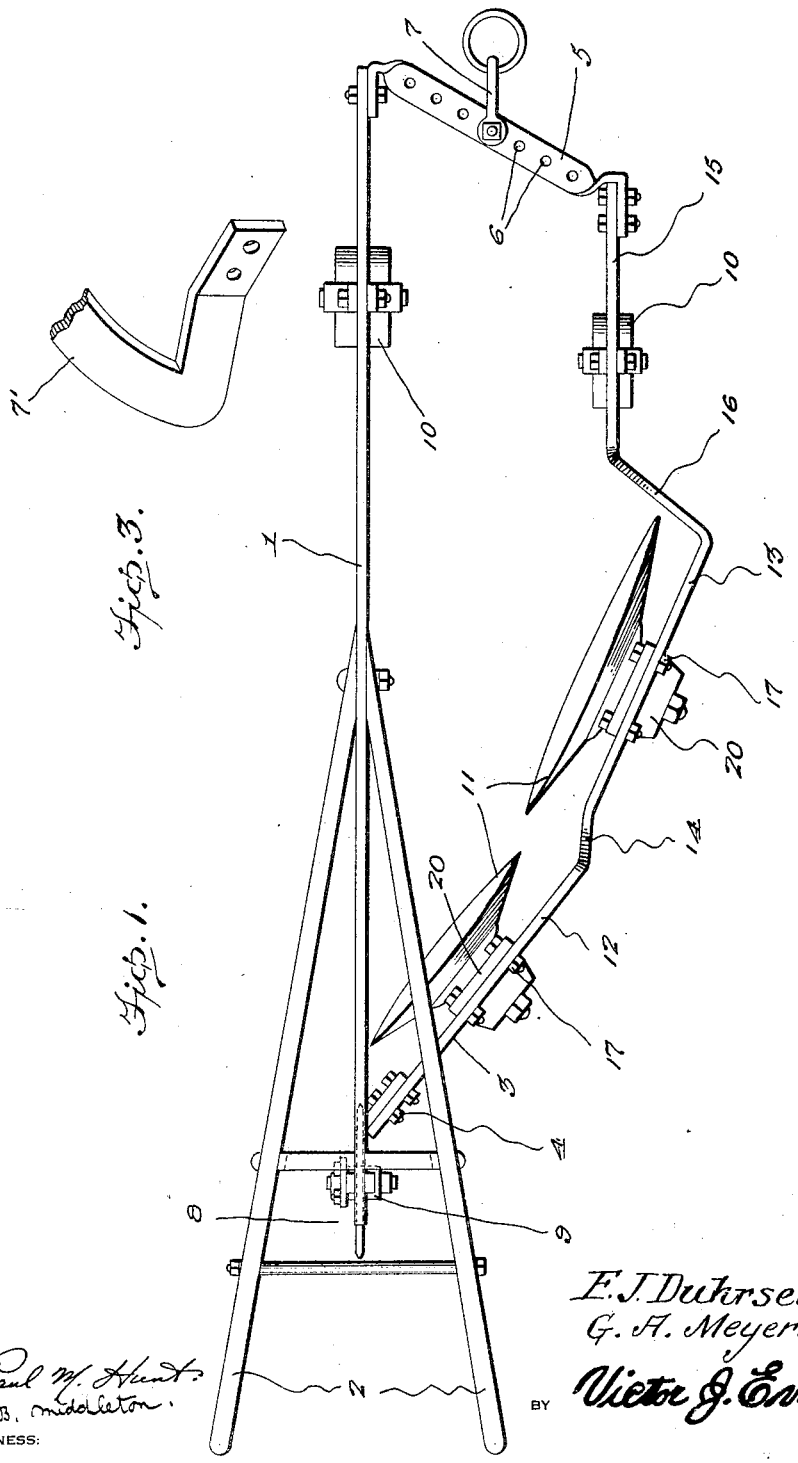

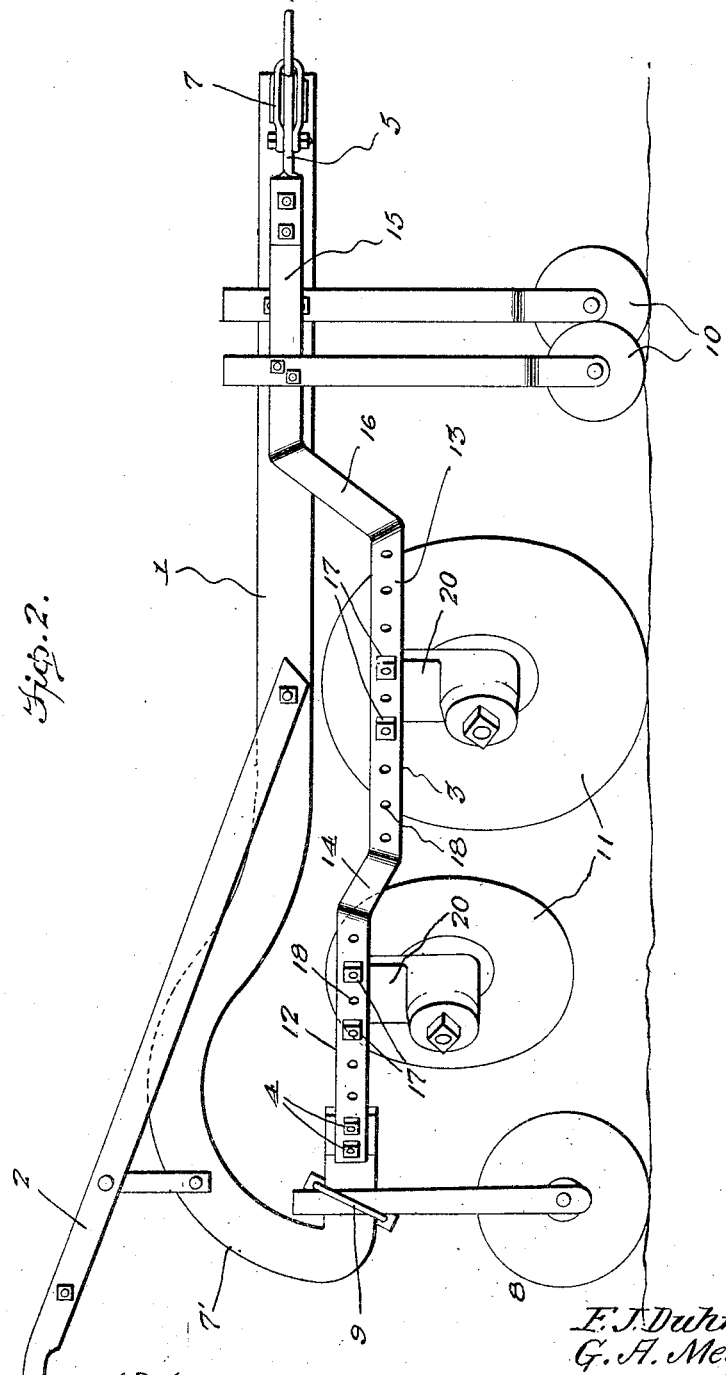

Patented Sept. 2, 1924.

1,506,818

UNITED STATES PATENT OFFICE.

GUSTAV A. MEYERS AND FREDERICK J. DUHRSEN, OF HUKALAU, TERRITORY OF HAWAII.

CULTIVATOR.

Application filed April 3, 1922. Serial No. 549,301.

*To all whom it may concern:*

Be it known that we, GUSTAV A. MEYERS and FREDERICK J. DUHRSEN, citizens of the United States, residing at Hukalau, Hawaii, have invented new and useful Improvements in Cultivators, of which the following is a specification.

This invention relates to a cultivator, the general object of the invention being to provide an implement of this nature which can be used for cultivating crops and which is so designed as to do the work which is ordinarily done by hoes.

Another object of the invention is to so place the plows that they will work the ground close up to the plants and will kill the weeds by covering them over with dirt.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the device.

Figure 2 is a side view.

Figure 3 is a detail view of the rear end of the main beam.

In these views 1 indicates the beam of the implement to which the handles 2 are secured and 3 indicates the plow carrying beam which is connected at its rear end with the rear end of the main beam by the bolts 4 and has its front end bolted to a cross bar 5 which is also bolted to the front end of the main beam 1. This bar 5 is provided with a plurality of holes 6 so that the clevis 7 can be adjustably secured therewith. The rear end of the main beam is of substantially hook-shape, as shown at 7', and a colter 8 is adjustably secured to this end of the main beam by the U-bolt 9. Wheels 10 are adjustably secured to both beams adjacent the front ends. A pair of disc plows 11 are carried by the beam 3, the front plow being of larger diameter than the rear one and these plows are in a plane which extends at an angle from the longitudinal plane of the main beam 1. The rear plow is carried by a straight part 12 of the beam 3 while the front plow is carried by a part 13 which is connected with part 12 by a part 14 which extends inwardly and downwardly from the part 12. The part 13 is connected with the front part 15 of beam 3 by a part 16 which extends upwardly and inwardly from part 13, the part 15 being substantially parallel with the main beam and in the same horizontal plane therewith. By this arrangement of parts the front plow will cut the weeds close up to the plants and draw them away from the row and turn the soil containing the weeds partly over. The rear plow will then engage this soil and turn it completely over, thus covering the weeds.

The hangers 20 for the plows are adjustably connected with the beam 3 by means of the bolts 17 engaging any one of a plurality of pairs of holes 18 in said beam. Said hangers are so formed that the plows are held at an incline with their tops closer to the beam than their bottoms. This is shown in Figure 1.

This implement is so simple that it can be made by any practical blacksmith. It may be adjusted to have the plows engage the soil to any depth and the wheels cannot only be adjusted vertically but also horizontally. The wheel or colter at the rear will steady the implement and keep it from traveling to one side.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. A cultivator of the class described comprising a main beam, an auxiliary beam having its rear end connected with the rear end of the main beam, a cross bar connecting the front ends of the beams together, a clevis adjustably connected with the cross bar, said auxiliary beam having a portion extending at an angle from the main beam and plows carried by said portion.

2. A cultivator of the class described comprising a main beam, an auxiliary beam connected therewith and having a portion extending at an angle therefrom, the intermediate portion of the main beam being connected with the rear portion by a downwardly and inwardly extending part and with the front portion by an upwardly and inwardly extending portion and plows connected with the intermediate portion and the rear portion.

In testimony whereof we affix our signatures.

FREDERICK J. DUHRSEN.
GUSTAV A. MEYERS.